(12) United States Patent
Li et al.

(10) Patent No.: US 11,086,172 B2
(45) Date of Patent: Aug. 10, 2021

(54) PIXEL UNIT, DISPLAY PANEL AND DISPLAY DEVICE

(71) Applicant: Xianyang Caihong Optoelectronics Technology Co., Ltd, Xianyang (CN)

(72) Inventors: Zhuo Li, Xianyang (CN); Boqin Cui, Xianyang (CN)

(73) Assignee: XIANYANG CAIHONG OPTOELECTRONICS TECHNOLOGY CO., LTD, Xianyang (CN)

( * ) Notice: Subject to any disclaimer, the term of this patent is extended or adjusted under 35 U.S.C. 154(b) by 0 days.

(21) Appl. No.: 16/745,751

(22) Filed: Jan. 17, 2020

(65) Prior Publication Data
US 2021/0141275 A1 May 13, 2021

(30) Foreign Application Priority Data
Nov. 7, 2019 (CN) .......................... 201911081173.X

(51) Int. Cl.
*G02F 1/1343* (2006.01)

(52) U.S. Cl.
CPC .. *G02F 1/134309* (2013.01); *G02F 1/134345* (2021.01)

(58) Field of Classification Search
CPC ... G02F 1/134309; G02F 2001/134345; G02F 1/134345; G02F 2001/134354; G02F 1/134354
See application file for complete search history.

(56) References Cited

U.S. PATENT DOCUMENTS

| 2008/0079884 A1* | 4/2008 | Chiu | G02F 1/136286 349/143 |
| 2012/0147282 A1* | 6/2012 | Shin | G02F 1/13624 349/38 |
| 2014/0104523 A1* | 4/2014 | Jung | G02F 1/1343 349/41 |
| 2016/0202564 A1* | 7/2016 | Kim | G02F 1/134309 349/43 |
| 2016/0202577 A1* | 7/2016 | Jung | G02F 1/133707 349/144 |

* cited by examiner

*Primary Examiner* — Jia X Pan
(74) *Attorney, Agent, or Firm* — WPAT, PC

(57) ABSTRACT

A pixel unit, a display panel and a display device are provided. The pixel unit includes: a first sub-pixel, comprising a first sub-region and a second sub-region; and a second sub-pixel, disposed adjacent to the first sub-pixel and comprising a third sub-region and a fourth sub-region; wherein the first sub-region is disposed adjacent to the third sub-region, and the second sub-region is disposed adjacent to the fourth sub-region; wherein a divided voltage of the first sub-region is same as a divided voltage of the third sub-region; the divided voltage of the first sub-region, a divided voltage of the second sub-region and a divided voltage of the fourth sub-region are different from one another. The pixel unit of the embodiment is advantageous for improving the washout and color shift problem of a larger side view angle and improving the optical characteristics of the viewing angle.

16 Claims, 2 Drawing Sheets

PIXEL UNIT, DISPLAY PANEL AND DISPLAY DEVICE

FIELD OF THE DISCLOSURE

The disclosure relates to a display technology field, and more particularly to a pixel unit, a display panel and a display device.

BACKGROUND OF THE DISCLOSURE

Vertical Alignment (VA) type liquid crystal display has a large change in the phase difference of the liquid crystal in the front view and the side view because the liquid crystal belongs to the vertical arrangement mode, which causes the front view and the side view gamma to be different. There will be problems with side view and face color shift, and washout will appear when viewed sideways.

In the related art, in order to improve the washout and color shift problem of the side view angle of the liquid crystal panel. Referring to FIG. 1, generally, an 8-domain pixel design is used, that is, one pixel is divided into two sub-regions, and the divided voltages of the two sub-regions are different, so that the liquid crystal tilt angles are different, so that liquid crystals with different tilt angles can compensate each other in side view. The front view and the side view gamma are relatively close to achieve the purpose of improving the optical characteristics of the viewing angle.

With regard to the above technical solutions, it is found that at least the following technical problem exists: since the above 8-domain pixel design has only two sub-regions, the liquid crystal compensation effect of the two different sub-regions is limited, and the improvement effect of the washout and color shift problems is not obvious at a larger viewing angle. According to the SONY color deviation specification, the four skin color deviations are all oversized according to the visual role bias simulation result. Moreover, the washout improvement ability is weakened at a larger viewing angle. For example, in the 60-degree viewing angle, the phase difference between the liquid crystal front view and the side view liquid crystal is largely different, and the compensation effect is weak, and the washout and color shift problems at a large viewing angle cannot be effectively improved.

Therefore, it is necessary to improve one or more problems existing in the above related technical solutions.

It is noted that this section is intended to provide a context or context for the embodiments of the disclosure set forth in the claims. The description herein is not admitted to be prior art as it is included in this section.

SUMMARY OF THE DISCLOSURE

It is an object of embodiments of the disclosure to provide a pixel unit, a display panel, and a display device, and at least to some extent overcome one or more problems due to limitations and disadvantages of the related art.

According to a first aspect of the embodiments of the disclosure, a pixel unit is provided, including:
- a first sub-pixel, including a first sub-region and a second sub-region; and
- a second sub-pixel, disposed adjacent to the first sub-pixel and including a third sub-region and a fourth sub-region;
- wherein the first sub-region is disposed adjacent to the third sub-region, and the second sub-region is disposed adjacent to the fourth sub-region;
- wherein a divided voltage of the first sub-region is same as a divided voltage of the third sub-region; the divided voltage of the first sub-region, a divided voltage of the second sub-region and a divided voltage of the fourth sub-region are different from one another.

In one embodiment of the disclosure, the divided voltage of the first sub-region and the divided voltage of the third sub-region each are greater than any one of the divided voltage of the second sub-region and the divided voltage of the fourth sub-region.

In one embodiment of the disclosure, the divided voltage of the second sub-region is greater than the divided voltage of the fourth sub-region.

In one embodiment of the disclosure, the first sub-region and the third sub-region have a same area, and the second sub-region and the fourth sub-region have a same area.

In one embodiment of the disclosure, an area ratio of the first sub-region to the second sub-region is between 1:1 and 1:3.

In one embodiment of the disclosure, the first sub-region and the third sub-region have a same structure, and the second sub-region and the fourth sub-region have a same structure.

In one embodiment of the disclosure, the first sub-region, the second sub-region, the third sub-region and the fourth sub-region each include a four-domain electrode structure.

According to a second aspect of the embodiments of the disclosure, there is provided a display panel including the plurality of pixel units described in the above embodiments.

According to a third aspect of an embodiment of the disclosure, there is provided a display device including the display panel described in the above embodiments.

The technical solutions provided by the embodiments of the disclosure may include the following beneficial effects:

In the embodiment of the disclosure, through the above pixel unit, the display panel and the display device, each pixel unit includes three sub-regions with different divided voltages, compared with the conventional pixel unit including 2 sub-regions, the pixel units of the three sub-regions have more liquid crystal alignments with different pretilt angles, and the liquid crystals with different tilt angles in the side view have better compensation effects. Making the front view and side view gamma closer to each other is beneficial to improve the washout and color shift of the larger side view angle and improve the viewing angle optical characteristics of the liquid crystal display panel.

BRIEF DESCRIPTION OF THE DRAWINGS

The accompanying drawings, which are incorporated in the specification. It is apparent that the drawings in the following description are only some of the embodiments of the disclosure, and other drawings may be obtained from those skilled in the art without departing from the drawings.

DETAILED DESCRIPTION OF EMBODIMENTS

Figure 1:
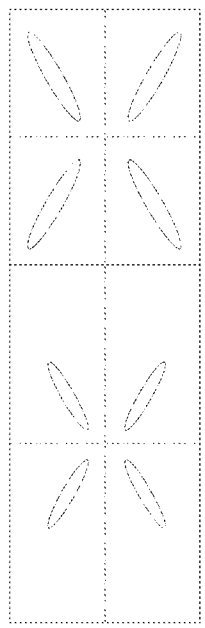
FIG. 1 is a schematic structural view of a conventional 8-domain pixel unit.

Example embodiments will now be described more fully with reference to the accompanying drawings. Example embodiments can be embodied in many forms, and should not be construed as being limited to the examples set forth herein; rather, these embodiments are provided so that this disclosure will be more complete and complete. The described features, structures, or characteristics may be combined in any suitable manner in one or more embodiments.

In addition, the drawings are merely schematic illustrations of the embodiments of the disclosure, are not necessarily drawn to scale. The same reference numerals in the drawings denote the same or similar parts, and the repeated description thereof will be omitted. Some of the block diagrams shown in the figures are functional entities and do not necessarily have to correspond to physically or logically separate entities.

Figure 2:
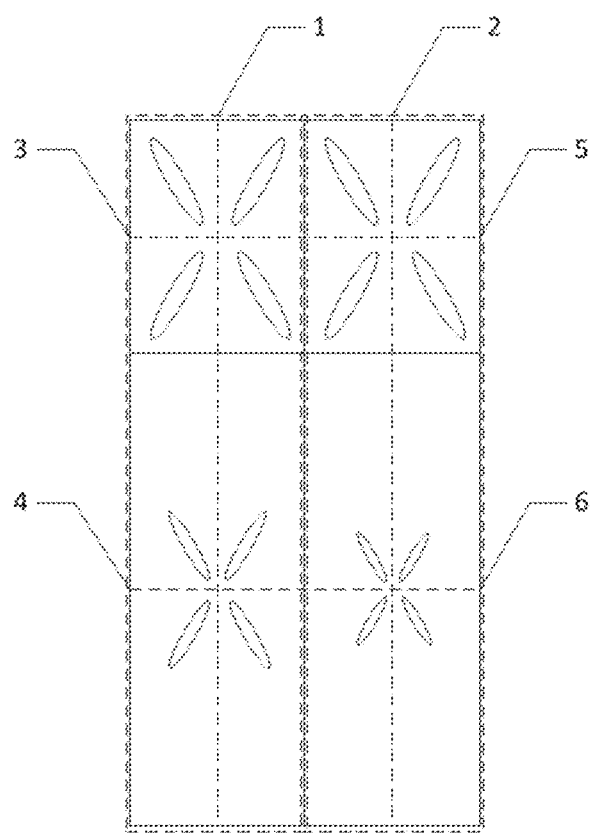
FIG. 2 is a schematic structural view of a pixel unit according to an embodiment of the disclosure.

A pixel unit is first provided in the embodiment. Referring to FIG. 2, the pixel unit may include a first sub-pixel 1 and a second sub-pixel 2, the first sub-pixel 1 includes a first sub-region 3 and a second sub-region 4; the second sub-pixel 2 is disposed adjacent to the first sub-pixel 1, including a third sub-region 5 and a fourth sub-region 6; the first sub-region 3 is disposed adjacent to the third sub-region 5, and the second sub-region 4 is disposed adjacent to the fourth sub-region 6; the divided voltages of the first sub-region 3 and the third sub-region 5 are the same; the divided voltages of the first sub-region 3, the second sub-region 4 and the fourth sub-region 6 are different from one another.

In the embodiment of the disclosure, the pixel unit includes three sub-regions with different divided voltages. Compared with the conventional pixel unit including 2 sub-regions, the pixel units of the three sub-regions have more liquid crystal alignments with different pretilt angles, and the liquid crystals with different tilt angles in the side view have better compensation effects. Making the front view and side view gamma closer to each other is beneficial to improve the washout and color shift of the larger side view angle and improve the viewing angle optical characteristics of the liquid crystal display panel.

Hereinafter, each portion of the above-described pixel unit in the embodiment will be described in more detail with reference to FIGS. 2 to 4.

In one embodiment, the first sub-pixel 1 and the second sub-pixel 2 adjacent to each other constitute one pixel unit, and the first sub-pixel 1 and the second sub-pixel 2 each include two sub-regions of different divided voltages. The two different divided sub-regions in the first sub-pixel 1 are the first sub-region 3 and the second sub-region 4, and the two different divided sub-regions in the second sub-pixel 2 are the third sub-region 5 and the fourth sub-region 6; wherein, the first sub-region 3 and the third sub-region 5 are adjacent to each other, and the divided voltages of the two sub-regions are the same, and the pretilt angles of the corresponding liquid crystals in the first sub-region 3 and the third sub-region 5 are the same; the second sub-region 4 and the fourth sub-region 6 are adjacent to each other, and the divided voltages of the first sub-region 3, the second sub-region 4, and the fourth sub-region 6 are different. The pretilt angles of the corresponding liquid crystals in the first sub-region 3, the second sub-region 4, and the fourth sub-region 6 are different.

In one embodiment, the first sub-region 3 and the third sub-region 5 together constitute a main pixel area of the pixel unit, and the pretilt angle of the liquid crystal of the main pixel area is more suitable for the front view; the second sub-region 4 and the fourth sub-region 6 respectively form two sub-pixel regions of the pixel unit, and the pretilt angle of the liquid crystal of the sub-pixel region is more suitable for the side view angle; the pretilt angle of the liquid crystal in the next pixel region of different divided voltages is suitable for the side view angle of different angles, and the pretilt angle of the liquid crystal of the sub-pixel region with smaller divided voltage is more suitable for the side view angle with larger angle.

Figure 3:
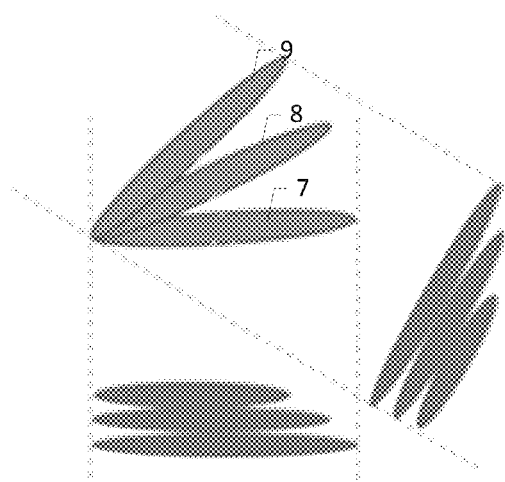
FIG. 3 is a liquid crystal alignment diagram of the pixel unit according to the embodiment of the disclosure.
Figure 4:
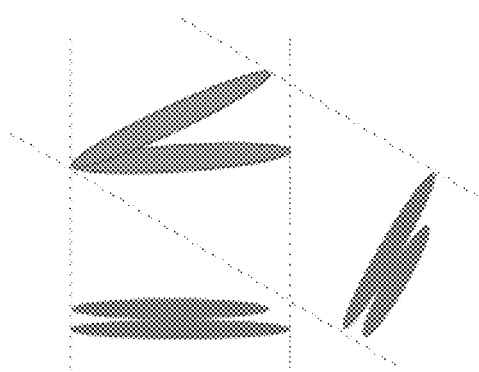
FIG. 4 is a liquid crystal alignment diagram of the conventional 8-domain pixel unit.

For example, referring to FIG. 3, taking the front view, the side view 45 degrees, and the side view 60 degrees as an example, the first sub-region 3 and the third sub-region 5 in the front view have the largest divided voltages. The pretilt angle of the liquid crystal 7 under divided voltages of the first sub-region 3 and the third sub-region 5 is suitable for the front view; the divided voltage of the second sub-region 4 is second, and the pretilt angle of the liquid crystal 8 under the divided voltage of the second sub-region 4 is suitable for a viewing angle of 45 degrees from the side view, and has a better compensation effect for the side view direction with a viewing angle of 45 degrees; the fourth sub-region 6 has the smallest divided voltage, and the pre-tilt angle of the liquid crystal 9 under the fourth sub-region 6 is suitable for the viewing angle of 60 degrees in the side view, and has a better compensation effect for the side viewing direction with the viewing angle of 60 degrees. Therefore, compared to the conventional 8-domain pixel design, referring to FIG. 4, FIG. 4 is a liquid crystal alignment of a conventional 8-domain pixel design. The embodiment of the disclosure designs the pixel unit to include three different divided voltage sub-region structures, which is advantageous for improving washout and color shift problems of a larger side view angle. For example, the phase difference of the liquid crystal in the front view and the side view at a viewing angle of 60 degrees is reduced, the compensation effect of the liquid crystals with different pretilt angles is enhanced, and the washout and color shift problems at a large viewing angle are effectively improved.

In one embodiment, the divided voltages of the first sub-region 3 and the third sub-region 5 are greater than the divided voltages of the second sub-region 4 and the fourth sub-region 6, and the divided voltage of the second sub-region 4 is greater than the divided voltage of the fourth sub-region 6. In another embodiment, the divided voltages of the first sub-region 3 and the third sub-region 5 are greater than the divided voltages of the second sub-region 4 and the fourth sub-region 6, and the divided voltage of the fourth sub-region 6 is greater than the divided voltage of the second sub-region 4. The second sub-region 4 and the fourth sub-region 6 are two different divided sub-pixel regions, and the divided voltages of the two sub-pixel regions are different. The divided voltage of the second sub-region 4 may be greater than the divided voltage of the fourth sub-region 6, or the divided voltage of the fourth sub-region 6 may be greater than the divided voltage of the second sub-region 4.

In one embodiment, the voltage division of the first sub-region 3, the second sub-region 4, the third sub-region 5, and the fourth sub-region 6 can be controlled by a voltage dividing component such as a voltage dividing capacitor or a voltage dividing resistor. For example, a voltage dividing resistor is respectively disposed in the first sub-region 3, the second sub-region 4, the third sub-region 5, and the fourth sub-region 6. The resistance values of the voltage dividing resistors of the first sub-region 3 and the third sub-region 5 are the same, and the resistance values of the voltage dividing resistors of the first sub-region 3, the second sub-region 4, and the fourth sub-region 6 are different. For details, refer to the prior art, and details are not described herein again.

In one embodiment, the first sub-region 3, the second sub-region 4, the third sub-region 5, and the fourth sub-region 6 respectively include a four-domain electrode structure; specifically, the four-domain electrode structure may include two main electrodes and four-domain branch electrodes, and the four-domain branch electrodes are located in the liquid crystal alignment region, and the liquid crystals are aligned in four different directions. Each of the domain branch electrodes includes a plurality of strip-shaped branch electrodes arranged in parallel, and adjacent ones of the four-domain branch electrodes may be mirror-symmetrical.

In one embodiment, the first sub-region 3 has the same structure as the third sub-region 5, and the second sub-region 4 has the same structure as the fourth sub-region 6. Specifically, the angles, the pitches, and the widths of the domain branch electrodes corresponding to the first sub-region 3 and the third sub-region 5 are the same, under the same divided voltage, the pretilt angles of the liquid crystals aligned by the domain branch electrodes corresponding to the first sub-region 3 and the third sub-region 5 are the same; the angles, pitches, and widths of the domain branch electrodes corresponding to the second sub-region 4 and the fourth sub-region 6 are the same, under different divided voltages, the angles of the liquid crystal pretilt angles of the respective domain branch electrodes corresponding to the second sub-region 4 and the fourth sub-region 6 are different.

In one embodiment, the pre-tilt angles of the corresponding liquid crystals of the first sub-region 3 and the third sub-region 5 are the same, that is, the first sub-region 3 and the third sub-region 5 have four liquid crystal alignments with different pretilt angles, and the second sub-region 4 and the fourth sub-region 6 respectively have four liquid crystal alignments with different pretilt angles. There are 12 different pre-tilt liquid crystal alignments in the pixel unit, forming a 12-domain pixel design. Compared with the conventional 8-domain pixel design, there are four different pre-tilt liquid crystal alignments. For the side view angle, there is better compensation effect, which is better than the 8-domain pixel design in terms of color shift improvement.

In one embodiment, the areas of the two sub-regions of the main pixel area may be the same, that is, the areas of the first sub-region 3 and the third sub-region 5 are the same. The area of the two sub-pixel regions may be the same, that is, the areas of the second sub-region 4 and the fourth sub-region 6 are the same. The area ratio of the first sub-region 3 to the second sub-region 4 may be between 1:1 and 1:3, and the area ratio of the third sub-region 5 to the fourth sub-region 6 may be 1:1 to 1:3. For example, in a specific embodiment, the area ratio of the first sub-region 3, the second sub-region 2, the third sub-region 3, and the fourth sub-region 4 may be 1:2:1:2. By setting appropriate divided voltage and area ratios for the main pixel area and the two sub-pixel regions, the liquid crystal alignment of different pretilt angles is adjusted, and the side view angle is better compensated. Further, the side view angle is enlarged, and the optical characteristics of the side view angle are improved.

In the embodiment of the disclosure, the liquid crystal may be a VA (Vertical Alignment) type liquid crystal, which is not specifically limited herein.

Also provided in the exemplary embodiment is a display panel including a plurality of pixel units described in the above embodiments. Specifically, in one embodiment, the liquid crystal display panel includes a pixel array substrate, and a plurality of data lines and a plurality of scanning lines disposed on the array substrate define a plurality of pixel units. Each of the pixel units includes a first sub-pixel 1 and a second sub-pixel 2, and the first sub-pixel 1 and the second sub-pixel 2 may be pixels of any one of RGB colors; the first sub-pixel 1 and the second sub-pixel 2 may respectively connect different thin film transistors (TFTs); the display panel may further include a liquid crystal layer. For details, refer to the prior art, and details are not described herein again.

Also provided in the exemplary embodiment is a display device including a plurality of display panels described in the above embodiments.

In the embodiment of the disclosure, through the above pixel unit, the display panel and the display device, each pixel unit includes three sub-regions with different divided voltages, compared with the conventional pixel unit including 2 sub-regions, the pixel units of the three sub-regions have more liquid crystal alignments with different pretilt angles, and the liquid crystals with different tilt angles in the side view have better compensation effects. Making the front view and side view gamma closer to each other is beneficial to improve the washout and color shift of the larger side view angle and improve the viewing angle optical characteristics of the liquid crystal display panel.

In the description of the disclosure, it is to be understood that the orientation or positional relationship of the terms "center", "longitudinal", "transverse", "length", "width", "thickness", "up", "down", "before", "after", "left", "right", "vertical", "horizontal", "top", "bottom", "inside", "outside", "clockwise", "counter clockwise" and the like is based on the orientation or positional relationship shown in the drawings, and is merely for convenience of description of the disclosure and simplified description. Instead of indicating or implying that the device or component referred to must have a particular orientation, constructed and operated in a particular orientation, it is not to be construed as limiting the disclosure.

Moreover, the terms "first" and "second" are used for descriptive purposes only and are not to be construed as indicating or implying a relative importance or implicitly indicating the number of technical features indicated. Thus, features defining "first" and "second" may include one or more of the features either explicitly or implicitly. In the description of the disclosure, the meaning of "a plurality" is two or more unless specifically and specifically defined otherwise.

In the embodiments of the disclosure, the terms "installation", "connected", "fixed", and the like, are to be understood broadly, unless clearly defined and defined otherwise. For example, it may be a fixed connection, a detachable connection, or an integral; it can be a mechanical connection or an electrical connection; it can be directly connected or indirectly connected through an intermediate medium, which can be the internal communication of two elements or the interaction of two elements. The specific meanings of the above terms in the disclosure can be understood by those skilled in the art on a case-by-case basis.

In the disclosure, the first feature "on" or "under" the second feature may include direct contact of the first and second features, unless otherwise explicitly stated and defined. It may also be included that the first and second features are not in direct contact but are contacted by additional features between them. Moreover, the first feature "above" and "on" the second feature includes the first feature directly above and above the second feature, or merely indicating that the first feature level is higher than the second feature. The first feature "below" and "under" the second feature includes the first feature directly below and below the second feature, or merely the first feature level being less than the second feature.

In the description of this specification, the description of the terms "one embodiment", "some embodiments", "examples", "specific examples", "an example" or the like means that the specific features, structures, materials, or characteristics described in connection with the embodiments or examples are included in at least one embodiment or example of the disclosure. In the specification, the schematic representation of the above terms is not necessarily directed to the same embodiment or example. Furthermore, the particular features, structures, materials, or characteristics described may be combined in a suitable manner in any one or more embodiments or examples. Further, various embodiments or examples described in this specification can be joined and combined by those skilled in the art.

The above is a further detailed description of the disclosure in connection with the specific preferred embodiments, and the specific embodiments of the disclosure are not limited to the description. It will be apparent to those skilled in the art that the disclosure may be made without departing from the spirit and scope of the disclosure.

What is claimed is:

1. A pixel unit, comprising:
    a first sub-pixel, comprising a first sub-region and a second sub-region juxtaposed adjacent to each other in a vertical direction; and
    a second sub-pixel, being juxtaposed adjacent to the first sub-pixel in a horizontal direction and comprising a third sub-region and a fourth sub-region juxtaposed adjacent to each other in the vertical direction;
    wherein the first sub-region is juxtaposed adjacent to the third sub-region in the horizontal direction and together constitute a main pixel area of the pixel unit, and the second sub-region is juxtaposed adjacent to the fourth sub-region in the horizontal direction;
    wherein a divided voltage of the first sub-region is same as a divided voltage of the third sub-region; the divided voltage of the first sub-region, a divided voltage of the second sub-region and a divided voltage of the fourth sub-region are different from one another;
    wherein the first sub-region, the second sub-region, the third sub-region and the fourth sub-region each comprise a four-domain electrode structure including two main electrodes and four-domain branch electrodes.

2. The pixel unit according to claim 1, wherein the divided voltage of the first sub-region and the divided voltage of the third sub-region each are greater than any one of the divided voltage of the second sub-region and the divided voltage of the fourth sub-region.

3. The pixel unit according to claim 1, wherein the divided voltage of the second sub-region is greater than the divided voltage of the fourth sub-region.

4. The pixel unit according to claim 1, wherein the first sub-region and the third sub-region have the same area, and the second sub-region and the fourth sub-region have the same area.

5. The pixel unit according to claim 4, wherein an area ratio of the first sub-region to the second sub-region is between 1:1 and 1:3.

6. The pixel unit according to claim 1, wherein the first sub-region and the third sub-region have the same structure, and the second sub-region and the fourth sub-region have the same structure.

7. A display panel, comprising a pixel unit:
    wherein the pixel unit comprises:
    a first sub-pixel, comprising a first sub-region and a second sub-region juxtaposed adjacent to each other in a vertical direction; and
    a second sub-pixel, disposed immediately neighboring with the first sub-pixel in a horizontal direction and comprising a third sub-region and a fourth sub-region juxtaposed adjacent to each other in the vertical direction;
    wherein the first sub-region is juxtaposed neighboring with the third sub-region in the horizontal direction and together constitute a main pixel area of the pixel unit, and the second sub-region is juxtaposed neighboring with the fourth sub-region in the horizontal direction;
    wherein a divided voltage of the first sub-region and a divided voltage of the third sub-region are the same; the divided voltage of the first sub-region, a divided voltage of the second sub-region and a divided voltage of the fourth sub-region are different from one another;
    wherein the first sub-region, the second sub-region, the third sub-region and the fourth sub-region each comprise a four-domain electrode structure including two main electrodes and four-domain branch electrodes.

8. The display panel according to claim 7, wherein the divided voltage of the first sub-region and the divided voltage of the third sub-region each are greater than any one of the divided voltage of the second sub-region and the divided voltage of the fourth sub-region.

9. The display panel according to claim 7, wherein the divided voltage of the second sub-region is greater than the divided voltage of the fourth sub-region.

10. The display panel according to claim 7, wherein the first sub-region and the third sub-region have the same area, and the second sub-region and the fourth sub-region have the same area.

11. The display panel according to claim 10, wherein an area ratio of the first sub-region to the second sub-region is between 1:1 and 1:3.

12. The display panel according to claim 7, wherein the first sub-region and the third sub-region have the same structure, and the second sub-region and the fourth sub-region have the same structure.

13. A display device, comprising a display panel:
    wherein the display panel comprises a pixel unit, and the pixel unit comprises:
    a first sub-pixel, comprising a first sub-region and a second sub-region juxtaposed adjacent to each other in a vertical direction; and
    a second sub-pixel, being juxtaposed adjacent to the first sub-pixel in a horizontal direction and comprising a third sub-region and a fourth sub-region juxtaposed adjacent to each other in the vertical direction;
    wherein the first sub-region is juxtaposed adjacent to the third sub-region in the horizontal direction and together constitute a main pixel area of the pixel unit, and the second sub-region is juxtaposed adjacent to the fourth sub-region in the horizontal direction;
    wherein a divided voltage of the first sub-region and a divided voltage of the third sub-region are the same; the divided voltage of the first sub-region, a divided voltage of the second sub-region and a divided voltage of the fourth sub-region are different from one another;
    wherein pretilt angles of liquid crystals in the first sub-region and the third sub-region are the same, and pretilt angles of liquid crystals in the first sub-region, the second sub-region and the fourth sub-region are different from one another;

wherein the first sub-region, the second sub-region, the third sub-region and the fourth sub-region each comprise a four-domain electrode structure including two main electrodes and four-domain branch electrodes, each of the four-domain branch electrodes comprises a plurality of strip-shaped branch electrodes arranged in parallel, and adjacent ones of the four-domain branch electrodes are mirror-symmetrical.

14. The display device according to claim 13, wherein the divided voltage of the first sub-region and the divided voltage of the third sub-region each are greater than any one of the divided voltage of the second sub-region and the divided voltage of the fourth sub-region; and the divided voltage of the second sub-region is greater than the divided voltage of the fourth sub-region.

15. The display device according to claim 13, wherein the first sub-region and the third sub-region have the same area, and the second sub-region and the fourth sub-region have the same area.

16. The display device according to claim 13, wherein the first sub-region and the third sub-region have the same structure, and the second sub-region and the fourth sub-region have the same structure.

* * * * *